United States Patent
Kato et al.

(10) Patent No.: US 11,174,181 B2
(45) Date of Patent: Nov. 16, 2021

(54) ACCELERATED OXIDATION TREATMENT METHOD AND ACCELERATED OXIDATION TREATMENT DEVICE

(71) Applicant: METAWATER Co., Ltd., Tokyo (JP)

(72) Inventors: Yasuhiro Kato, Tokyo (JP); Kensuke Okuda, Tokyo (JP); Michiko Aoki, Tokyo (JP); Naoki Kanekawa, Tokyo (JP)

(73) Assignee: METAWATER Co., Ltd., Tokyo (JP)

(*) Notice: Subject to any disclaimer, the term of this patent is extended or adjusted under 35 U.S.C. 154(b) by 0 days.

(21) Appl. No.: 16/090,643

(22) PCT Filed: Apr. 5, 2017

(86) PCT No.: PCT/JP2017/014219
§ 371 (c)(1),
(2) Date: Oct. 2, 2018

(87) PCT Pub. No.: WO2017/175794
PCT Pub. Date: Oct. 12, 2017

(65) Prior Publication Data
US 2019/0112210 A1    Apr. 18, 2019

(30) Foreign Application Priority Data
Apr. 5, 2016   (JP) .............................. JP2016-075562

(51) Int. Cl.
*C02F 1/72* (2006.01)
*C02F 1/78* (2006.01)
*C02F 1/00* (2006.01)

(52) U.S. Cl.
CPC .............. *C02F 1/722* (2013.01); *C02F 1/008* (2013.01); *C02F 1/72* (2013.01); *C02F 1/78* (2013.01);
(Continued)

(58) Field of Classification Search
CPC .. C02F 1/722; C02F 1/008; C02F 1/78; C02F 1/72; C02F 2209/40; C02F 2209/23
(Continued)

(56) References Cited

U.S. PATENT DOCUMENTS

2004/0045886 A1* 3/2004 Abe .................. C02F 1/325
                                                            210/198.1

FOREIGN PATENT DOCUMENTS

| CN | 104129872 A | | 11/2014 | |
|----|-------------|---|---------|---|
| JP | H05228480 A | * | 9/1993 | ............... C02F 1/32 |
| JP | 2001239280 A | | 9/2001 | |
| JP | 2002263670 A | * | 9/2002 | ............... C02F 1/32 |

(Continued)

OTHER PUBLICATIONS

Oct. 9, 2018, International Preliminary Report on Patentability issued in the International Patent Application No. PCT/JP2017/014219.

(Continued)

*Primary Examiner* — Claire A Norris
*Assistant Examiner* — Ekandra S. Miller-Cruz
(74) *Attorney, Agent, or Firm* — Kenja IP Law PC

(57) ABSTRACT

An accelerated oxidation treatment method of performing oxidation treatment upon treatment water by supplying ozone and hydrogen peroxide to the treatment water, including an accelerated oxidation treatment process of bringing hydrogen peroxide and ozone into contact with the treatment water, and a bromate ion concentration measurement process of measuring the bromate ion concentration in the treatment water after the accelerated oxidation treatment process, with the amount of hydrogen peroxide supplied in the accelerated oxidation treatment process being adjusted on the basis of the measured value of bromate ion concentration.

13 Claims, 2 Drawing Sheets

(52) U.S. Cl.
    CPC .. *C02F 2209/003* (2013.01); *C02F 2209/006* (2013.01); *C02F 2209/23* (2013.01); *C02F 2209/40* (2013.01)

(58) Field of Classification Search
    USPC .......................................................... 210/739
    See application file for complete search history.

(56) References Cited

FOREIGN PATENT DOCUMENTS

| | | | | |
|---|---|---|---|---|
| JP | 2002263670 A | | 9/2002 | |
| JP | 2006281061 A | * | 10/2006 | ................ C02F 1/72 |
| JP | 2006281061 A | * | 10/2006 | ................ C02F 1/72 |
| JP | 2008055366 A | | 3/2008 | |
| JP | 2009000677 A | | 1/2009 | |
| JP | 2015104726 A | * | 6/2015 | ................ C02F 1/78 |
| JP | 2015104726 A | | 6/2015 | |
| WO | WO-2014103440 A1 | * | 7/2014 | ................ C02F 1/32 |

OTHER PUBLICATIONS

May 9, 2017, International Search Report issued in the International Patent Application No. PCT/JP2017/014219.

Sep. 20, 2019, the Extended European Search Report issued by the European Patent Office in the corresponding European Patent Application No. 17779172.0.

Oct. 8, 2019, Notification of Reasons for Refusal issued by the Japan Patent Office in the corresponding Japanese Patent Application No. 2016-075562.

* cited by examiner

ACCELERATED OXIDATION TREATMENT METHOD AND ACCELERATED OXIDATION TREATMENT DEVICE

TECHNICAL FIELD

This disclosure relates to an accelerated oxidation treatment method, also referred to as an advanced oxidation process, and to an accelerated oxidation treatment device, and more particularly relates to an accelerated oxidation treatment method and to an accelerated oxidation treatment device that perform oxidation treatment upon water to be treated (herein after also termed "treatment water") by supplying ozone and hydrogen peroxide thereto.

BACKGROUND

In the prior art, water processing methods have been widely implemented in which substances such as organic matter, inorganic matter, odorous substances and so on are oxidized and eliminated from water to be treated by performing ozone treatment in which ozone gas is diffused into the water to be treated, thus employing the property of ozone of having strong oxidizing power. In ozone treatment, an oxidative decomposition reaction by ozone molecules and an oxidative decomposition reaction by hydroxyl radicals generated by the decomposition of ozone molecules are performed. In recent years, in particular, it has been found that the oxidizing power of hydroxyl radicals is extremely high, and accordingly an accelerated oxidation treatment method has been receiving attention in which, by combining hydrogen peroxide or the like with ozone and by thereby promoting the generation of hydroxyl radicals, it becomes possible to decompose substances that are difficult to decompose by the use of ozone molecules alone.

Therefore, in order to generate hydroxyl radicals with good efficiency and in order to maintain the ozone concentration in the treatment water within a fixed range, an accelerated oxidation treatment method has been proposed (for example refer to PTL1) for adjusting the amount of ozone and the amount of hydrogen peroxide supplied to the treatment water. According to the accelerated oxidation treatment method proposed in PTL1, the ozone concentration in the treatment water is controlled to a concentration range in which it is possible to generate hydroxyl radicals with good efficiency.

Furthermore, an accelerated oxidation treatment method has also been proposed (for example refer to PTL2) in which the amount of hydrogen peroxide injected is determined on the basis of the dissolved ozone concentration in the treatment water. In concrete terms, in this accelerated oxidation treatment method described in PTL2, the amount of hydrogen peroxide that is injected is controlled in order to reduce the dissolved ozone concentration in the treatment water, after hydrogen peroxide and ozone have been added and have reacted together.

CITATION LIST

Patent Literature

PTL1: JP 2001-239280 A
PTL2: JP 2009-677 A

SUMMARY

Technical Problem

Now, in such an accelerated oxidation treatment method, if components containing bromine (hereinafter also termed "bromine containing compounds") are present in the treatment water, then there has been a concern that bromate ions may be generated as by-products of the oxidative decomposition reaction by the ozone or by the hydroxyl radicals. The per se known flow of generation of bromate ions is as follows. First, bromine ions ($Br^-$) in the treatment water generate hypobromous ions ($OBr^-$) by reacting with the ozone. And these hypobromous ions are further oxidized by the ozone to produce bromate ions ($BrO_3^-$). Now, the bromate ions are a carcinogenic substance, and this is a regulated substance whose standard value is described in water quality standards. Due to this, there has been a requirement to reduce the amount of bromate ions in the treated water.

Even when the amount of ozone dissolved in the treatment water that is the subject of the accelerated oxidation treatment is the same, the ratio of generation of bromate ions to the dissolved ozone amount varies greatly according to variations of conditions of various types, such as the temperature of the treatment water, its pH, the amount of bromine containing components contained in the treatment water, and so on. Therefore, in the prior art accelerated oxidation method described above in which the supply amount of hydrogen peroxide is adjusted according to the amount of dissolved ozone in the treatment water, it has not been possible sufficiently to suppress the generation of bromate ions when there is variation in the conditions.

Accordingly, it is the object of the invention of the present application to provide an accelerated oxidation treatment method, that is capable of sufficiently suppressing the generation of bromate ions, irrespective of variations of the condition of the treatment water.

Solution to Problem

The present inventors have conducted intensive investigations with the objective of solving the problem described above. First, in order to reduce the risk of generation of bromate ions by control of the elevation of the dissolved ozone concentration according to the prior art method described above, the present inventors have investigated (1) keeping down the amount of ozone supplied itself, and (2) the possibility of adopting the method of supplying an excess amount of hydrogen peroxide. However, as a result of these investigations by the present inventors, it has become clear that, if the amount of ozone supplied is kept down, then there is a danger that it will not be possible adequately to guarantee the efficiency at which the subject substance for decomposition is decomposed; and furthermore, if an excessive amount of hydrogen peroxide is supplied, then there is a serious demerit in terms of cost. Moreover, even when as described above the amount of dissolved ozone is the same, the risk of generation of bromate ions varies widely according to variations of conditions of various types related to the treatment water. Due to this, even though the concentration of dissolved ozone is reduced by permitting reduction of the efficiency of decomposition according to the method (1) described above, in some cases it is not possible sufficiently to suppress the generation of bromate ions. Furthermore, even if the concentration of dissolved ozone is reduced by permitting increase of cost according to the method (2) described above, if the condition of the treatment water is such that bromate ions cannot easily be generated, then, since the concentration of dissolved ozone has been unnecessarily reduced, accordingly it may be supposed that a situation may develop in which the extra cost is being spent unnecessarily.

Therefore the inventors of the present application have discovered that, by adjusting the amount of hydrogen peroxide supplied to the accelerated oxidation treatment on the basis of the concentration of bromate ions, it is possible adequately to suppress the generation of bromate ions irrespective of variations of the conditions of the treatment water, and have conceived the invention of the present application on the basis of that realization.

Accordingly, with the object of solving the problems described above in an advantageous manner, the accelerated oxidation treatment method of the present disclosure is a method of performing oxidation treatment upon treatment water by supplying ozone and hydrogen peroxide to the treatment water, comprising: an accelerated oxidation treatment process of bringing hydrogen peroxide and ozone into contact with the treatment water, and a bromate ion concentration measurement process of measuring the bromate ion concentration in the treatment water after the accelerated oxidation treatment process, characterized in that the amount of hydrogen peroxide supplied in the accelerated oxidation treatment process is adjusted on the basis of the measured value of the bromate ion concentration. According to such an accelerated oxidation treatment method, it is possible to suppress the generation of bromate ions, irrespective of variations of the condition of the treatment water.

Here, in the accelerated oxidation treatment of the present disclosure, it is desirable for there to be further included, before the accelerated oxidation treatment process, an ozone contacting process of bringing ozone into contact with the treatment water, wherein a total ozone supply amount in the ozone contacting process and in the accelerated oxidation treatment process is adjusted independently of the measured value of the bromate ion concentration. This is because, according to such an accelerated oxidation treatment method, it is possible to achieve both enhanced efficiency in processing the treatment water and also suppression of the generation of bromate ions in a compatible manner at high levels.

And, in the accelerated oxidation treatment of the present disclosure, it is desirable for there to be further included, before the ozone contacting process, a treatment water quality monitoring process of monitoring the quality of the treatment water, and for the total ozone supply amount to be determined on the basis of the quality of the treatment water acquired in the treatment water quality monitoring process, and, if the total ozone supply amount has been increased, for the amount of hydrogen peroxide supplied in the accelerated oxidation treatment process to be increased to track it. This is because, according to such an accelerated oxidation treatment method, along with enhancing the responsiveness to variations of the quality of the treatment water, it is also possible to suppress the generation of bromate ions in an efficient manner.

Furthermore, in the accelerated oxidation treatment of the present disclosure, it is desirable, after the amount of hydrogen peroxide supplied in the accelerated oxidation treatment process has increased, if the measured value of bromate ion concentration obtained in the bromate ion concentration measurement process exceeds a predetermined threshold value, for adjustment to be performed so as to reduce the amount of ozone supplied in the ozone contacting process and so as to increase the amount of ozone supplied in the accelerated oxidation treatment process, while keeping the total ozone supply amount constant. This is because, according to such an accelerated oxidation treatment method, it is possible to suppress the generation of bromate ions at a yet higher level of efficiency.

And yet further, with the object of solving the problems described above in an advantageous manner, the accelerated oxidation treatment device of the present disclosure is an accelerated oxidation treatment device for performing oxidation treatment upon treatment water by supplying ozone and hydrogen peroxide to the treatment water, characterized by comprising: an accelerated oxidation treatment tank in which hydrogen peroxide and ozone are brought into contact with treatment water; a bromate ion concentration measurement device configured to measure the bromate ion concentration in the treatment water after the accelerated oxidation treatment tank; and a hydrogen peroxide supply amount control device configured to adjust the amount of supply of hydrogen peroxide to the accelerated oxidation treatment tank on the basis of the measured value of bromate ion condensation measured by the bromate ion concentration measurement device. According to such a structure, it is possible to suppress the generation of bromate ions, irrespective of variations of the condition of the treatment water.

Advantageous Effect

According to the accelerated oxidation treatment device and the accelerated oxidation treatment method of the present disclosure, it is possible to suppress the generation of bromate ions, irrespective of variations of the condition of the treatment water.

DETAILED DESCRIPTION

An embodiment of the present disclosure will now be explained in detail with reference to the appended drawings. The accelerated oxidation treatment method and the accelerated oxidation treatment device of the present disclosure are not to be considered as being particularly limited; for example, in a water treatment facility or the like, they may be employed for advanced processing for removing organic matter, inorganic matter, odorous substances and so on in the treatment water. Furthermore, the present disclosure may be suitably applied in the case of employing ozone processing and accelerated oxidation treatment in processing for utilization of recycled sewage such as has become widely used recently, from the standpoint of ensuring comfort and security if the probability is high that people may come into direct contact with the resulting treated water.

Figure 1:
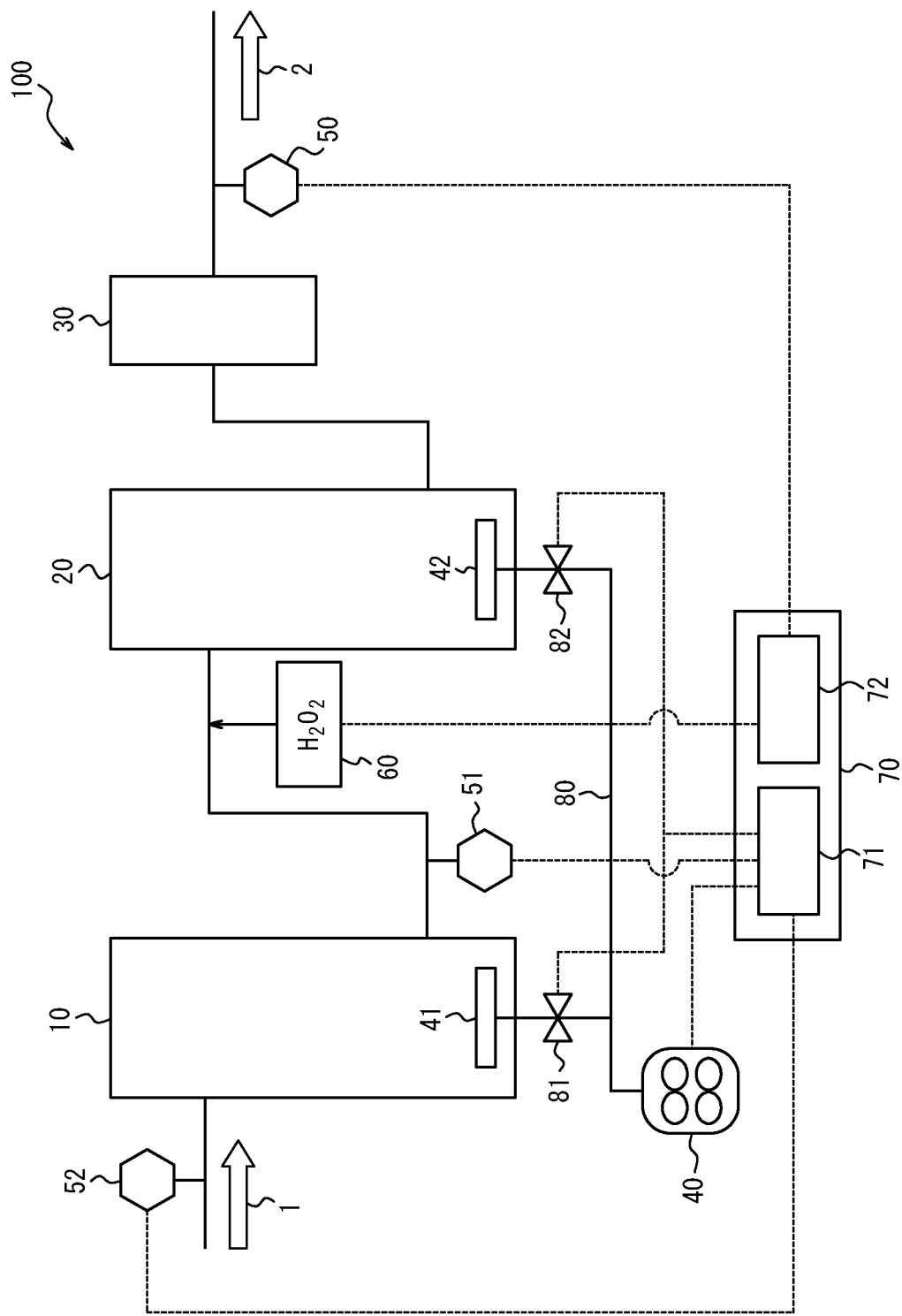
FIG. 1 is an explanatory figure illustrating the general structure of a representative accelerated oxidation treatment device that performs an accelerated oxidation treatment method according to the present disclosure.

An Accelerated Oxidation Treatment Method and an Accelerated Oxidation Treatment Device FIG. 1 is an explanatory figure illustrating the general structure of a representative accelerated oxidation treatment device that performs an accelerated oxidation treatment method according to the present disclosure. Here, the accelerated oxidation treatment device 100 illustrated in FIG. 1 treats water for which treatment is required. This accelerated oxidation treatment device 100 comprises an accelerated oxidation treatment tank 20 and a bromate ion concentration measurement device 50. With the accelerated oxidation treatment device 100, the treatment water is introduced (as illustrated by the arrow 1 in the figure) into the device 100 via an inlet (not illustrated) by natural gravity feed or by pumping, and, after hydrogen peroxide and ozone have been brought into contact with the treatment water in the accelerated oxidation treatment tank 20, it is discharged out of the system (as illustrated by the arrow 2 in the figure) via an outlet (not illustrated). At this time, the amount of hydrogen peroxide that is injected into the accelerated oxidation treatment tank 20 is adjusted on the basis of the measured value of bromate ion concentration obtained by the bromate ion concentration measurement device 50. It should be understood that, in the following, the inlet side of the accelerated oxidation treatment device 100 will sometimes be termed the "upstream side", and the outlet side will sometimes be termed the "downstream side".

Preferably, the accelerated oxidation treatment device 100 comprises an ozone contacting tank 10 on the upstream side of the accelerated oxidation treatment tank 20, comprises an activated carbon processing tank 30 on the downstream side of the accelerated oxidation treatment tank 20, and further comprises an ozone generator 40 that generates ozone for supply to the ozone contacting tank 10 and to the accelerated oxidation treatment tank 20. Furthermore, it is desirable for the accelerated oxidation treatment device 100 to comprise a dissolved ozone concentration measurement device 51, a water quality monitoring device 52 that monitors the quality of the treatment water, and so on. In the following, each of these structural elements will be described, along with the processing that it performs. It should be understood that although, in this specification, the ozone contact step included in the accelerated oxidation treatment according to the present disclosure is described as being a process that takes place in the ozone contacting tank 10, and the accelerated oxidation treatment process is described as being a process that takes place in the accelerated oxidation treatment tank 20, the accelerated oxidation treatment method according to the present disclosure is not to be considered as being limited by the presence or absence of each or any of such physical parts. In other words, for example, if the condition that the accelerated oxidation treatment occurs due to supply of ozone and hydrogen peroxide to the treatment water can be satisfied, then, irrespective of the presence or absence of a "water tank" in which the accelerated oxidation treatment can take place, even if the structure is such that the accelerated oxidation treatment takes place in a configuration that is "tubular", as long as the amount of hydrogen peroxide supplied in this accelerated oxidation treatment is adjusted according to the measured value of the concentration of bromate ions after the accelerated oxidation treatment, this is to be considered as being included within the category of the accelerated oxidation treatment according to the present disclosure.

The Treatment Water

The treatment water which is the subject of processing by the accelerated oxidation treatment device 100 is not particularly limited; it may, for example, be raw water for tap water. In concrete terms, water taken from dams or rivers or the like, lake water, well water, spring water, groundwater and so on are possibilities for the treatment water. Furthermore, the treatment water may include organic substances or subject materials for decomposition containing a component having a bromine ingredient. There may be a tendency for the concentration of bromine ions in the treatment water to be high, such as for example if the treatment water has been affected by seawater or industrial wastewater or the like, or by groundwater containing salt or the like.

The Treatment Water Quality Monitoring Device

It is desirable for the water quality of the treatment water introduced into the ozone contacting tank via the inlet to be monitored by the treatment water quality monitoring device 52. The water quality of the treatment water acquired by the treatment water quality monitoring device 52 can be used for determining the total amount of ozone to be supplied in the ozone contacting process and in the accelerated oxidation treatment process. The treatment water quality monitoring device 52 is not to be considered as being particularly limited; it may be implemented by any per se known water quality measurement sensor, such as, for example, a thermometer, a COD (Chemical Oxygen Demand) measurement device, a UV (Ultra Violet) meter, a pH meter or the like. And, of course, it would also be possible to employ a plurality of these sensors in combination.

The Ozone Contacting Tank

The ozone contacting tank 10 performs an ozone contacting process in which ozone is brought into contact with the treatment water. Ozone generated by the ozone generator 40 is fed into the ozone contacting tank 10 via a first ozone diffusion device 41. It should be understood that the ozone contacting tank 10 is a standard ozone contacting tank of a type that is in general use. Contact between the ozone and the treatment water may be performed, for example, by flowing the ozone that has been introduced into the tank into the treatment water as minute air bubbles. In this case, in order to enhance the efficiency of contact between the treatment water and the ozone, stirring, reduction of the size of the air bubbles, adjustment of the speed at which the ozone is introduced, and so on may be implemented as appropriate. By doing this, a part of the ozone that has come into contact with the treatment water reacts with the substances therein that are to be decomposed and decomposes them, while the remainder of the ozone dissolves in the treatment water.

Here, in general, bromate ions ($BrO_3^-$) are generated when ozone reacts with a bromine-containing component that contains bromine ions ($Br^-$). With the accelerated oxidation treatment device illustrated in FIG. 1, ozone is supplied into the treatment water in the ozone contacting tank 10 and in the accelerated oxidation treatment tank 20. Bromate ions may be generated in treatment water that lingers in the various constituent parts of the system after the ozone contacting tank 10 or in the treatment water that passes through them. It will be understood that a certain reaction time is required for the generation of bromate ions. As a result of investigations by the present inventors, it has become clear that, in the case of performing a standard amount of processing upon treatment water of standard quality, in a water treatment method in which an ozone contacting process is implemented before an accelerated oxidation treatment process, the time required for the ozone treatment step is quite short. Accordingly, in an accelerated oxidation treatment method in which an ozone contacting process is implemented before an accelerated oxidation treatment process, the time required for the ozone contacting process can be made to be shorter than the time required for the accelerated oxidation step. Due to this, it is possible to reduce the probability of occurrence of bromate ions in the ozone contacting process.

The Dissolved Ozone Concentration Measurement Device

The concentration of dissolved ozone in the treatment water that has passed through the ozone contacting tank 10 is measured by the dissolved ozone concentration measurement device 51, which is provided at a position that is on the downstream side of the ozone contact 10 and on the upstream side of the accelerated oxidation treatment tank 20. The dissolved ozone concentration measurement device 51 is not to be considered as being particularly limited, provided that it is capable of measuring the concentration of dissolved ozone in the treatment water; it may be implemented with any per se known dissolved ozone measuring device.

The Accelerated Oxidation Treatment Tank

The treatment water that has been contacted with ozone in the ozone contacting tank 10 is supplied to the accelerated oxidation treatment tank 20. In a similar manner to the case with the ozone contacting tank 10, ozone generated by the ozone generator 40 is introduced into the accelerated oxidation treatment tank 20 via a second ozone diffusion device 42. And hydrogen peroxide that is supplied by a hydrogen peroxide injection device 60 and the ozone mentioned above are contacted with the treatment water in the accelerated oxidation treatment tank 20. At this time, due to the ozone and the hydrogen peroxide reacting in the accelerated oxidation treatment tank 20, hydroxyl radicals are generated, whose oxidizing power is stronger than that of ozone. Due to such hydroxyl radicals, substances to be decomposed in the treatment water are decomposed, and in particular substances are decomposed that are difficult to decompose and that could not be completely decomposed in the ozone contacting tank 10. Furthermore, since the ozone is decomposed by the hydroxyl radicals generated as described above, accordingly it is possible to avoid the amount of ozone becoming excessive, so that it is possible to suppress the bromine containing component and the ozone from reacting together to generate bromate ions. It should be understood that per se known and conventional equipment may be employed for the accelerated oxidation treatment tank 20 and the hydrogen peroxide injection device 60.

The Hydrogen Peroxide Injection Device

The hydrogen peroxide injection device 60 supplies hydrogen peroxide to the accelerated oxidation treatment tank 20 on the basis of the measured value of the bromate ion concentration in the treatment water that has passed through the accelerated oxidation treatment tank 20 as obtained by the bromate ion concentration measurement device 50. FIG. 1 illustrates a mode in which the hydrogen peroxide is supplied into the treatment water on the upstream side of the accelerated oxidation treatment tank 20, but, provided that it is possible to supply the hydrogen peroxide into the treatment water at a position which is on the downstream side of the ozone contact water tank and the position where the dissolved ozone concentration is measured and as far downstream as the outlet aperture of the accelerated oxidation treatment tank 20, the position where the hydrogen peroxide is supplied into the treatment water is not to be considered as being particularly limited; it may be provided at any appropriate position. For example, of course it is possible to structure the hydrogen peroxide injection device 60 so that it directly injects the hydrogen peroxide into the accelerated oxidation treatment tank 20. It should be understood that the hydrogen peroxide injection device 60 should not be considered as being particularly limited; it could be implemented by a conventional chemical injection means that can be attached to this water processing device, and, for example, the injection device 60 may be implemented by the provision of a hydrogen peroxide storage tank, a supply pump, a flow rate adjustment valve, and so on.

The Ozone Generator

The ozone generator 40 is communicated with the first ozone diffusion device 41 and the second ozone diffusion device 42 via an ozone supply conduit 80, and supplies ozone gas to the ozone contacting tank 10 and to the accelerated oxidation treatment tank 20 via these diffusion devices. The first ozone diffusion device 41 and the second ozone diffusion device 42 may, for example, comprise diffusion tubes having holes, or membrane diffusion tubes or the like. And it is desirable to provide a first ozone amount adjustment device 81 and a second ozone amount adjustment device 82 to the ozone supply conduit 80. The first and second ozone amount adjustment devices 81 and 82 are not to be considered as being particularly limited, provided that they are capable of adjusting the amounts of ozone provided to the ozone contacting tank 10 and to the accelerated oxidation treatment tank 20 respectively; for example, they may be flow rate adjustment valves. If the first and second ozone amount adjustment devices 81 and 82 are built as flow rate adjustment valves, then it is possible to adjust the amounts of ozone supplied to the tanks 10 and 20 by changing the opening amounts of these flow rate adjustment valves. Moreover it would also be possible to apply a method in which, without changing the flow rate of the ozone gas, the concentration of the ozone gas that is generated is controlled by employing a control signal for the ozone generator 40. It should be understood that the ozone generator 40 is not to be considered as being particularly limited; for example, a per se known ozone generator may be used that converts oxygen to ozone by employing electrons that are generated by electrical discharge.

The Activated Carbon Processing Tank

Organic material or the like remaining in the treatment water after it has passed through the accelerated oxidation treatment tank 20 can also be adsorbed upon activated carbon in the activated carbon processing tank 30. The activated carbon processing tank 30 should not be considered as being particularly limited; for example, it would be possible to employ a configuration such as an activated carbon adsorption pond that is widely used.

The Bromate Ion Concentration Measurement Device

The bromate ion concentration measurement device 50 measures the bromate ion concentration in the treatment water that has passed through the accelerated oxidation treatment tank 20. Here, in FIG. 1, a mode is adopted in which a single bromate ion concentration measurement device 50 is disposed downstream of the activated carbon processing tank 30, so that the concentration of bromate ions in the treatment water is measured after processing in the activated carbon processing tank 30. However, provided that at least a mechanism is provided for measuring the bromate ion concentration on the downstream side of the accelerated oxidation treatment tank 20, the accelerated oxidation treatment device 100 according to this embodiment is not to be considered as being particularly limited; it would be acceptable to dispose one or a plurality of bromate ion concentration measurement devices 50 at any appropriate positions. For example, if two bromate ion concentration measurement devices 50 are provided to the accelerated oxidation treatment device 100, then one may be disposed like the bromate ion concentration measurement device 50 illustrated in FIG. 1, while the other is disposed in a position in which it can measure the concentration of bromate ions in the treatment water downstream of the ozone contacting tank 10 and upstream of the accelerated oxidation treatment tank 20. For example, in a configuration in which two of the bromate ion concentration measurement devices 50 are provided, by comparing together the measured values obtained by these two measurement devices which are in different measurement positions, it is possible to narrow down the position where the bromate ions are being generated, and it is possible to perform adjustment so as to reduce the amount of ozone at the position where the amount of bromate ions generated is large.

A measurement device that is capable of automatically measuring bromate ion concentration on site may be employed as the bromate ion concentration measurement device 50. An example of such a bromate ion concentration measurement device 50 that may be cited is, for example, a bromate ion concentration measurement device that performs a first step of passing the treatment water through an anion exchanger that selectively adsorbs bromate ions, a second step of passing through the anion exchanger a hydrochloric acid solution including a fluorescent substance the intensity of whose fluorescence changes due to the presence of bromate ions, a third step of measuring the intensity of the fluorescence of the fluorescent substance included in this hydrochloric acid solution that has passed through the anion exchanger, and a fourth step of calculating the bromate ion concentration corresponding to the measured intensity of fluorescence by employing a calibration curve that gives the correspondence relationship between the intensity of the fluorescence of the fluorescent substance and the bromate ion concentration, and that measures the fluorescence intensity in one of the cases: when, in the third process, the excitation wavelength and the fluorescent wavelength are respectively 264 nm and 400 nm; when the excitation wavelength and the fluorescent wavelength are respectively 264 nm and 480 nm; and when the excitation wavelength and the fluorescent wavelength are respectively 300 nm and 400 nm.

The Control Device

Furthermore, it is desirable for the accelerated oxidation treatment device 100 to include a control device 70. And, desirably, the control device 70 further includes an ozone supply amount control device 70 and a hydrogen peroxide supply amount control device 72. The control device 70, the ozone supply amount control device 71, and the hydrogen peroxide supply amount control device 72 are not to be considered as being particularly limited; they may include a CPU (Central Processing Unit) and so on, and may include an internal or externally attached storage unit not illustrated in the figures (for example, a memory) and so on.

The ozone supply amount control device 71 controls the amount of ozone supplied both to the ozone contacting tank 10 and to the accelerated oxidation treatment tank 20 on the basis of the measured value of ozone concentration measured by the dissolved ozone concentration measurement device 51. Preferably, the ozone supply amount control device 71 determines the total amount of ozone to be supplied to the ozone contacting tank 10 and to the accelerated oxidation treatment tank 20 according to the quality of the treatment water on the upstream side of the ozone contacting tank 10 as monitored by the treatment water quality monitoring device 52. For example, since when the pH and/or the temperature of the treatment water vary the solubility of ozone in the treatment water also varies, accordingly the ozone supply amount may be increased or decreased so as to keep the dissolved ozone amount constant. And it is desirable for the ozone supply amount control device 71 to perform feedback control on the basis of the result of measurement by the dissolved ozone concentration measurement device 51 and thereby to perform fine adjustment of the amount of ozone supplied, so as to optimize the dissolved ozone amount.

The hydrogen peroxide supply amount control device 72 controls the amount of hydrogen peroxide supplied to the accelerated oxidation treatment tank 20 on the basis of the measured value of the bromate ion concentration in the treatment water at the downstream side of the accelerated oxidation treatment tank 20, as measured by the bromate ion concentration measurement device 50. In concrete terms, for example, the control device may automatically monitor the concentration of bromate ions after the accelerated oxidation treatment on site, and may increase the amount of hydrogen peroxide fed to the accelerated oxidation treatment if the amount of bromate ions generated has increased.

Here, it is desirable for the total amount of ozone supplied in the ozone contacting process and in the accelerated oxidation treatment process to be adjusted independently of the bromate ion concentration as measured by the bromate ion concentration measurement device 50. This is because, by adjusting the total amount of ozone supplied in the ozone contacting process and in the accelerated oxidation treatment process independently of the measured value of bromate ion concentration after the accelerated oxidation treatment process, it is possible to achieve both suppression of generation of bromate ions and also enhancement of the ozone decomposition efficiency at a high level.

On the other hand, according to this embodiment, it is also possible to adjust the amount of ozone supplied in the ozone contacting process according to the bromate ion concentration. Although this will be explained in detail hereinafter with reference to FIG. 2, in concrete terms, if the bromate ion concentration as measured by the bromate ion concentration measurement device 50 does not get down to a predetermined threshold value or less even though the amount of hydrogen peroxide supplied to the accelerated oxidation treatment tank 20 is increased, then it is possible to reduce the amount of ozone supplied to the ozone contacting tank 10. Due to this it is possible to cope with the situation in a satisfactory manner with good responsiveness, if the bromate ion concentration measurement device 50 has detected that bromate ions at high concentration have been generated due to contact between the ozone and the treatment water in the ozone contacting tank 10. When the amount of ozone supplied to the ozone contacting tank 10 decreases, by providing additional supply of ozone to the accelerated oxidation treatment tank 20 to supplement the amount of decrease, it is possible to maintain the total amount of ozone supplied to the ozone contacting tank 10 and the accelerated oxidation treatment tank 20. Due to this, it is possible to ensure the efficiency of decomposition of the substance to be decomposed throughout the entire processing by the ozone contacting tank 10 and the accelerated oxidation treatment tank 20.

Since in this manner, according to this embodiment, if the quality of the treatment water varies, it is possible to increase the amount of ozone supplied and thereby to strengthen the power for decomposing the substance to be decomposed while sufficiently suppressing the generation of bromate ions, accordingly, as a result, it is possible to achieve satisfactory water processing efficiency, even if the quality of the treatment water varies.

In the following, an example of the flow of control performed by the ozone supply amount control device 71 and the hydrogen peroxide supply amount control device 72 provided to the control device 70 will be explained with reference to FIG. 2.

First, on the basis of data that has been accumulated in advance, the control device determines the total amount of ozone to be supplied in the ozone contacting process and in the accelerated oxidation treatment process, the division ratio for this total amount between the ozone contacting process (in this example, in the ozone contacting tank 10) and the accelerated oxidation treatment process (in this example, in the accelerated oxidation treatment tank 20), the amount of hydrogen peroxide to be supplied in the accelerated oxidation treatment process, and so on. Similarly, an appropriate range for the dissolved ozone amount in the treatment water after the ozone contacting process and before the accelerated oxidation treatment is determined on the basis of data received and so on. In addition, a permitted concentration of bromate ions after the accelerated oxidation treatment is determined in advance according to the desired water quality standard.

In accordance with the distribution ratio that has been determined, the ozone supply amount control device 71 adjusts the amounts of ozone ($O_3$) to be supplied in the ozone contacting process and in the accelerated oxidation treatment process respectively (step S01). And then the ozone supply amount control device 71 checks whether or not the amount of ozone dissolved in the treatment water after the ozone contacting process and before the accelerated oxidation treatment process is within the appropriate range described above that was determined in advance (step S02). If the result is that the dissolved ozone amount is within the appropriate range (Yes in step S02), then the amounts of ozone being supplied to the ozone contacting process and to the accelerated oxidation treatment process are maintained, and a decision is made as to whether or not there is substantial variation in the quality of the treatment water (step S03). On the other hand, if the dissolved ozone amount is not within the appropriate range (No in step S02), then the flow of control returns to step S01 and the amount of ozone supplied to the ozone contacting process is adjusted. It should be understood that, desirably, in order to keep the total amount of ozone supplied in the ozone contacting process and in the accelerated oxidation treatment process the same as the previous total amount of supplied ozone, in the case of No in step S02, if the amount of ozone supplied in the ozone contacting process is increased or decreased so that the amount of dissolved ozone in the treatment water after the ozone contacting process and before the accelerated oxidation treatment becomes within the appropriate range, then the amount of ozone supplied in the accelerated oxidation treatment process is adjusted to track this increase or decrease.

When variation of the quality of the treatment water before the ozone contacting process has been detected by the water quality monitoring device 52 or the like described above (Yes in step S03), then the ozone supply amount control device 71 calculates an ozone supply amount suitable for the treatment water quality after variation on the basis of the previously given data or the like (step S04). If, as a result, the value of the ozone supply amount that has thus been calculated is greater than that in the present state (Yes in step S05), then the hydrogen peroxide supply amount control device 72 increases the amount of hydrogen peroxide ($H_2O_2$) supplied to the accelerated oxidation treatment process (step S06). The amount of increase at this time can be determined in an appropriate manner, so as to obtain a ratio with which the efficiency of the reaction of the ozone and the hydrogen peroxide is satisfactory. This ratio is not particularly limited, and it may be set to a ratio of ozone to hydrogen peroxide that is also capable of efficiently reducing the amount of hypobromous ions and thereby suppressing the generation of bromate ions. For example, by adding ozone and hydrogen peroxide in different ratios to the accelerated oxidation treatment tank 20 into which the treatment water has been fed, it is possible to determine the ratio for which the most satisfactory results can be obtained by preliminary experimentation. It should be understood that, if no variation of the quality of the treatment water is detected in step S03 (No in step S03), then the supply amount of ozone is maintained in the current state (step S09).

Next, the hydrogen peroxide supply amount control device 72 makes a decision as to whether or not the measured value of the bromate ion concentration in the treatment water after the accelerated oxidation treatment is less than or equal to a permitted concentration (step S07). If the result is that the measured value of the bromate ion concentration is less than or equal to the permitted concentration (Yes in step S07), then the supply amount of hydrogen peroxide to the accelerated oxidation treatment process is maintained (step S08). On the other hand, if the measured value of the bromate ion concentration is greater than the permitted concentration (No in step S07), then the flow of control returns to step S01, and the amount of ozone supplied to the ozone contacting process is reduced. In accordance with this control, the ozone supply amount control device 71 performs control so that the ozone supply amount in the accelerated oxidation treatment process is increased, and so that the total amount of ozone supplied in the ozone contacting process and the accelerated oxidation treatment process is controlled to be the same as the total ozone supply amount directly before increase of the ozone supply amount to the accelerated oxidation treatment process.

In particular, in the flow from S06 to No in S07 to S01, if the measured value of the bromate ion concentration does not become less than or equal to the permitted concentration even though the amount of hydrogen peroxide supplied to the accelerated oxidation treatment process is increased, then the amount of ozone supplied to the ozone contacting process is reduced. According to such control, if bromate ions that are included in the treatment water after the accelerated oxidation treatment process are generated, not in the accelerated oxidation treatment process, but in the ozone contacting process, then it is possible to suppress the generation of bromate ions in the ozone contacting process by keeping down the amount of ozone supplied to the ozone contacting process. In this manner, according to the control illustrated in FIG. 2, it is possible to deal with the bromate ions that can be generated in the accelerated oxidation treatment process by increasing the hydrogen peroxide supply amount in step S06 in the accelerated oxidation treatment process, and it is possible to deal with bromate ions that may be generated in the ozone contacting process by keeping down the amount of ozone supplied in the ozone contacting process in step S01, via No in step S07.

Furthermore it would also be acceptable for yet another decision step to be provided, if in step S07 it is determined that the bromate ion concentration is less than or equal to the permitted concentration (Yes in step S07). Such a decision step may, for example, be a step of determining whether the difference from the value of the bromate ion concentration measured the previous time is greater than or equal to a predetermined threshold value. If the result of this decision step is that it is determined that the bromate ion concentration is lower than the value measured the previous time by greater than or equal to the predetermined threshold value, then the hydrogen peroxide supply amount may be reduced. According to such a method, it is possible to reduce the operating cost by keeping down the hydrogen peroxide supply amount to the minimum required level. It should be understood that the "predetermined threshold value" here may be set as appropriate.

Figure 2:
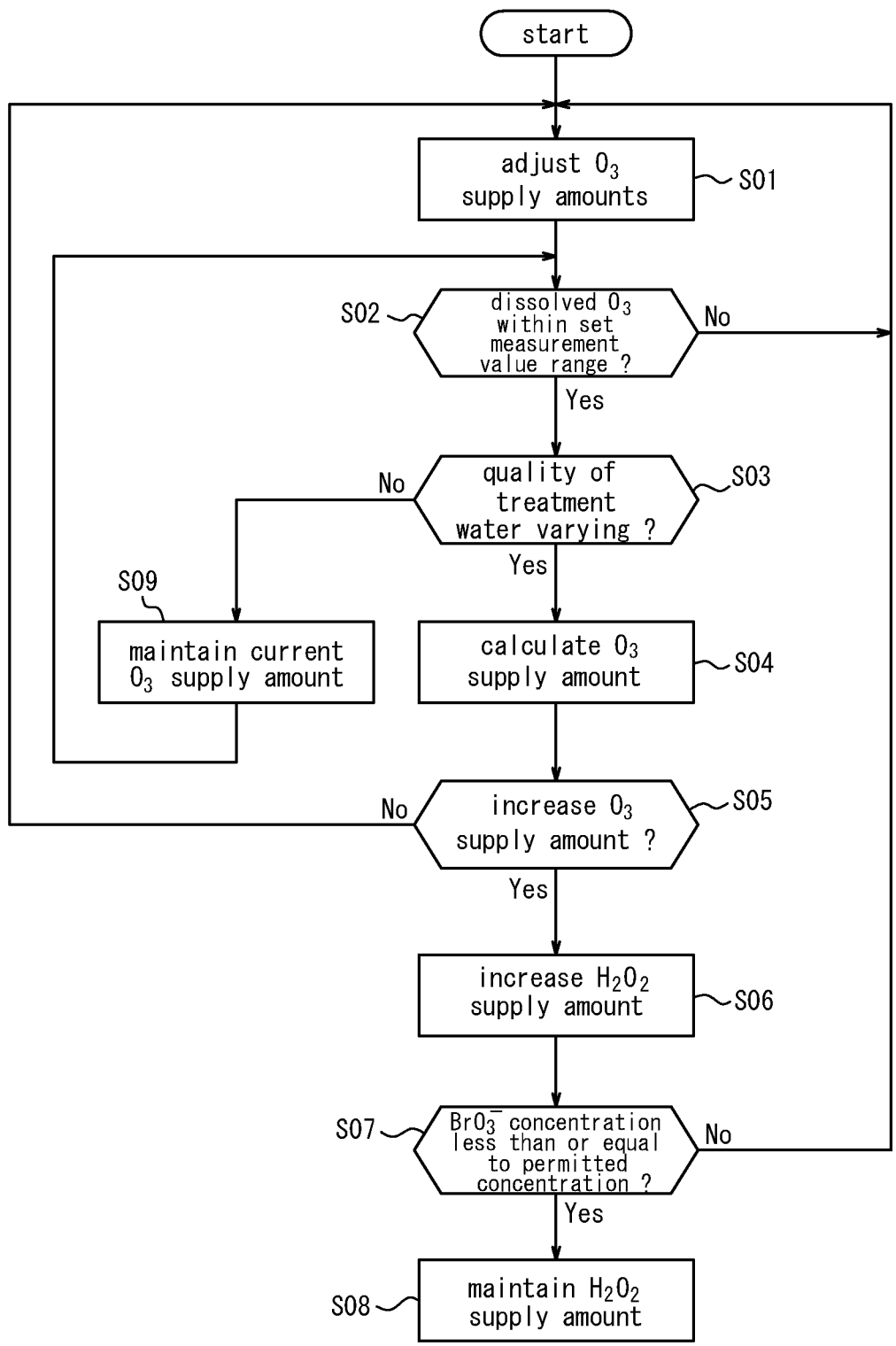
FIG. 2 is a flow chart illustrating an example of an accelerated oxidation treatment method according to the present disclosure.

It should be understood that, so far, the explanation herein has described a situation in which all of the control illustrated in FIG. 2 is performed by one of the control devices 71 and 72 that are provided to the control device 70. However it would of course be possible not to provide any control device 70 to the accelerated oxidation treatment device 100, but to arrange, for example, for the various types of control such as described above to be performed by monitoring personnel who perform manual operation.

Moreover, although the above explanation has described the accelerated oxidation treatment device and the accelerated oxidation treatment method of the present disclosure by employing examples thereof, the accelerated oxidation treatment device and the accelerated oxidation treatment method of the present disclosure should not be considered as being limited to the examples described above; it would be possible to supplement various changes, as appropriate. For example, of course it would also be possible to provide an aggregating agent addition means and a mixing means, and/or a membrane filtration device in a stage before the ozone contacting tank 10, for implementing processes of adding in and mixing a coagulant such as poly aluminum chloride (PACl) or the like, and/or for performing membrane filtration.

INDUSTRIAL APPLICABILITY

According to the accelerated oxidation treatment device and the accelerated oxidation treatment method of the present disclosure, it is possible sufficiently to suppress the generation of bromate ions, irrespective of variations of the condition of the treatment water.

REFERENCE SIGNS LIST

10: ozone contacting tank
20: accelerated oxidation treatment tank
30: activated carbon processing tank
40: ozone generator
41, 42: ozone diffusion devices
50: bromate ion concentration measurement device
51: dissolved ozone concentration measurement device
52: treatment water quality monitoring device
60: hydrogen peroxide injection device
70: control device
71: ozone supply amount control device
72: hydrogen peroxide supply amount control device
80: ozone supply conduit
81, 82: ozone amount adjustment devices
100: accelerated oxidation treatment device

The invention claimed is:

1. An accelerated oxidation treatment method, comprising: monitoring the quality of treatment water in a treatment water quality monitoring process to acquire a quality of the treatment water; supplying a first quantity of ozone to the treatment water; measuring an ozone concentration of the treatment water after supplying the first quantity of ozone; supplying a second quantity of ozone to the treatment water after the measuring of the ozone concentration of the treatment water; supplying a quantity of hydrogen peroxide to the treatment water after the measuring of the ozone concentration of the treatment water; measuring a bromate ion concentration in the treatment water after the supplying of the quantity of hydrogen peroxide to the treatment water; adjusting both the first quantity of ozone and the second quantity of ozone supplied to the treatment water; and adjusting the quantity of hydrogen peroxide supplied to the treatment water in accordance with the measured bromate ion concentration; wherein a total ozone supply amount, the total ozone supply amount being the sum of the first quantity of ozone and the second quantity of ozone, is determined on the basis of the quality of the treatment water acquired in the treatment water quality monitoring process, and wherein the total ozone supply amount is kept constant.

2. An accelerated oxidation treatment method according to claim 1, further comprising: increasing the quantity of hydrogen peroxide supplied to the treatment water and afterwards, adjustment is performed so as to reduce the first quantity of ozone and increase the second quantity of ozone, while keeping the total ozone supply amount constant.

3. An accelerated oxidation treatment method according to claim 1, further comprising: increasing the quantity of hydrogen peroxide supplied to the treatment water after the total ozone supply is increased.

4. An accelerated oxidation treatment method according to claim 2, wherein,
the adjustment so as to reduce the first ozone quantity and increase the second ozone quantity, while keeping the total ozone supply amount constant, is based on the bromate ion concentration.

5. An accelerated oxidation treatment method according to claim 1, wherein the measuring of the bromate ion concentration is measured on site.

6. An accelerated oxidation treatment method according to claim 1, wherein the supplying of the first quantity of ozone and the supplying of the second quantity of ozone are both performed again after the adjusting of both the first quantity of ozone and the second quantity of ozone.

7. An accelerated oxidation treatment method according to claim 1, wherein, in the supplying of the first quantity of ozone and in the supplying of the second quantity of ozone,
supplying the first quantity of ozone and the second quantity of ozone in accordance with the adjusted first quantity of ozone and adjusted second quantity of ozone.

8. An accelerated oxidation treatment method according to claim 6,
wherein, in the supplying of the first quantity of ozone, supplying the first quantity of ozone in accordance with the adjusted first quantity of ozone, and
in the supplying of the second quantity of ozone, supplying the second quantity of ozone in accordance with the adjusted second quantity of ozone.

9. An accelerated oxidation treatment method according to claim 8,
wherein, in the adjusting of both the first quantity of ozone and the second quantity of ozone, adjusting the first quantity of ozone and the second quantity of ozone when the measured ozone concentration of the treatment water is out of a predetermined range so as to optimize an ozone concentration such that it is within the predetermined range.

10. An accelerated oxidation treatment method according to claim 9,
wherein, in the adjusting of both the first quantity of ozone and the second quantity of ozone, maintaining the first quantity of ozone and the second quantity of ozone when the measured ozone concentration of the treatment water is within the predetermined range.

11. An accelerated oxidation treatment method according to claim 6, wherein in the adjusting of only the quantity of hydrogen peroxide, the supplying of the quantity of hydrogen peroxide is performed again after the adjusting of only the quantity of hydrogen peroxide.

12. An accelerated oxidation treatment method according to claim 7,
   wherein, in the supplying of the quantity of hydrogen peroxide, supplying the quantity of hydrogen peroxide in accordance with an adjusted bromate ion concentration.

13. An accelerated oxidation treatment device for performing oxidation treatment upon treatment water by supplying ozone and hydrogen peroxide to the treatment water, comprising: an ozone contacting tank in which a first ozone quantity is brought into contact with treatment water in an ozone contacting process; a dissolved ozone concentration measurement device for measuring a dissolved ozone concentration in the treatment water after the ozone contacting process; an accelerated oxidation treatment tank in which hydrogen peroxide is brought into contact with the treatment water, and a second ozone quantity is brought into contact with the treatment water in accordance with the dissolved ozone concentration in an accelerated oxidation treatment process after the ozone contacting process; a bromate ion concentration measurement device that measures a bromate ion concentration in the treatment water after the accelerated oxidation treatment process; a hydrogen peroxide supply amount control device that adjusts the amount of hydrogen peroxide supplied to the accelerated oxidation treatment tank on the basis of the bromate ion concentration measured by the bromate ion concentration measurement device; an ozone adjustment device that adjusts each of the first ozone quantity and the second ozone quantity based on the dissolved ozone concentration measured by the dissolved ozone concentration measurement device; a water quality monitoring device monitors a quality of the treatment water, wherein a total ozone supply amount, the total ozone supply amount being the sum of the first ozone quantity and the second ozone quantity, is determined on the basis of the quality of the treatment water acquired in the treatment water quality monitoring process, and wherein the total ozone supply amount is kept constant.

* * * * *